United States Patent
Park et al.

(10) Patent No.: US 7,585,770 B2
(45) Date of Patent: Sep. 8, 2009

(54) METHOD OF GROWING CARBON NANOTUBES AND METHOD OF MANUFACTURING FIELD EMISSION DEVICE HAVING THE SAME

(75) Inventors: Young-Jun Park, Suwon-si (KR); Ha-Jin Kim, Suwon-si (KR)

(73) Assignee: Samsung SDI Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 559 days.

(21) Appl. No.: 11/350,864

(22) Filed: Feb. 10, 2006

(65) Prior Publication Data

US 2006/0252251 A1 Nov. 9, 2006

(30) Foreign Application Priority Data

Feb. 15, 2005 (KR) .................. 10-2005-0012441

(51) Int. Cl.
*H01L 21/44* (2006.01)
(52) U.S. Cl. .................. 438/682; 438/618; 438/626; 438/629; 438/684; 257/E21.174; 257/E21.582
(58) Field of Classification Search .......... 438/630, 438/649, 651, 655, 664, 682, 903, FOR. 248, 438/FOR. 360, 602, 684; 257/E51.04, E51.038, 257/E39.008, E23.03, E23.117; 977/720, 977/722, 734, 742, 745, 842, 843, 844, 938
See application file for complete search history.

(56) References Cited

U.S. PATENT DOCUMENTS

| | | | |
|---|---|---|---|
| 2004/0131937 | A1 | 7/2004 | Chen et al. |
| 2004/0240157 | A1* | 12/2004 | Legagneux et al. ......... 361/516 |
| 2005/0079118 | A1 | 4/2005 | Maruyama et al. |
| 2005/0090176 | A1* | 4/2005 | Dean et al. .................. 445/51 |
| 2005/0104056 | A1* | 5/2005 | Nihei ........................ 257/22 |
| 2005/0167755 | A1* | 8/2005 | Dubin et al. ............... 257/368 |

FOREIGN PATENT DOCUMENTS

| | | |
|---|---|---|
| JP | 2001-236879 | 8/2001 |
| JP | 2004-026532 | 1/2004 |

OTHER PUBLICATIONS

Office Action from the Japanese Patent Office issued in Applicant's corresponding Japanese Patent Application No. 2006-034351 dated Oct. 16, 2007.

* cited by examiner

*Primary Examiner*—N Drew Richards
*Assistant Examiner*—Kyoung Lee
(74) *Attorney, Agent, or Firm*—Robert E. Bushnell, Esq.

(57) ABSTRACT

In a method of forming carbon nanotubes (CNTs) and a method of manufacturing a field emission display (FED) device using the CNTs, the method includes preparing a substrate on which a silicon layer is formed, sequentially forming a buffer layer and a catalyst metal layer on the silicon layer, partly forming metal silicide domains by diffusion between the silicon layer, the buffer layer and the catalyst metal layer by annealing the substrate, and growing CNTs on a surface of the catalyst metal layer.

23 Claims, 15 Drawing Sheets

25°C

450°C

460°C

470°C

480°C

490°C

480°C

500°C

METHOD OF GROWING CARBON NANOTUBES AND METHOD OF MANUFACTURING FIELD EMISSION DEVICE HAVING THE SAME

CLAIM OF PRIORITY

This application makes reference to, incorporates the same herein, and claims all benefits accruing under 35 U.S.C. § 119 from an application for METHOD OF GROWING CARBON NANOTUBES AND METHOD OF MANUFACTURING FIELD EMISSION DEVICE HAVING THE SAME, earlier filed in the Korean Intellectual Property Office on 15 Feb. 2005 and there duly assigned Serial No. 10-2005-0012441.

BACKGROUND OF THE INVENTION

1. Technical Field

The present invention relates to a method of growing carbon nanotubes (CNTs) and a method of manufacturing a field emission display (FED) device using the CNTs and, more particularly, to a method of growing CNTs having an appropriate density as an emitter for an FED device and a method of manufacturing an FED device having the CNTs.

2. Related Art

Carbon nanotubes (CNTs) have drawn attention as emitters for field emission display (FED) devices. CNTs can be grown by a thermal chemical vapor deposition (thermal CVD) method, an arc discharge method, a laser abrasion method, and a plasma enhanced chemical vapor deposition (PECVD) method.

The thermal CVD method grows CNTs in a vertical direction from a surface of a catalyst metal layer by injecting both a gas containing carbon, such as $CH_4$, $C_2H_2$, $C_2H_4$, $C_2H_6$, CO, or $CO_2$, and a gas such as $H_2$, $N_2$, or Ar into a reactor which is maintained at a temperature of approximately 500-900° C. after forming a catalyst metal layer on a surface of an electrode formed on a substrate. In addition, the PECVD method grows CNTs using a catalyst metal layer.

SUMMARY OF THE INVENTION

The present invention relates to a method of growing CNTs wherein the density of the carbon nanotubes (CNTs) is controlled, and also relates to a method of manufacturing a field emission display (FED) device having high electron emission characteristics by controlling the density of a CNT emitter.

According to an aspect of the present invention, a method of forming CNTs comprises the steps of: preparing a substrate on which a silicon layer is formed; sequentially forming a buffer layer and a catalyst metal layer on the silicon layer; partly forming metal silicide domains by diffusion between the silicon layer, the buffer layer and the catalyst metal layer by annealing the substrate; and growing CNTs on a surface of the catalyst metal layer.

According to another aspect of the present invention, a method of manufacturing an FED device comprises the steps of: preparing a substrate on which a cathode, a silicon layer which covers the cathode and the substrate, a gate insulating layer which covers the silicon layer, and a gate electrode are formed; forming a well in the gate electrode and the gate insulating layer, wherein the well exposes the silicon layer on a bottom thereof; sequentially forming a buffer layer and a catalyst metal layer on the silicon layer; partly forming metal silicide domains in the silicon layer, the buffer layer and the catalyst metal layer by diffusion between the silicon layer, the buffer layer and the catalyst metal layer by annealing the substrate; and forming a CNT emitter by growing CNTs on a surface of the catalyst metal layer.

In the present invention, CNTs of an appropriate density are grown on a surface of a catalyst metal layer by not growing the CNTs on regions where metal silicide domains are formed.

The metal silicide domains are formed by diffusion between a catalyst metal layer and a silicon layer, and a buffer layer facilitates control of the degree of formation of the metal silicide domains by mitigating diffusion action between the catalyst metal layer and the silicon layer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more fully with reference to the accompanying drawings in which exemplary embodiments of the invention are shown.

Figure 1A:
FIG. 1A is an SEM image of a carbon nanotube (CNT) emitter of a field emission display (FED) device formed by a chemical vapor deposition (CVD) method.
Figure 1B:
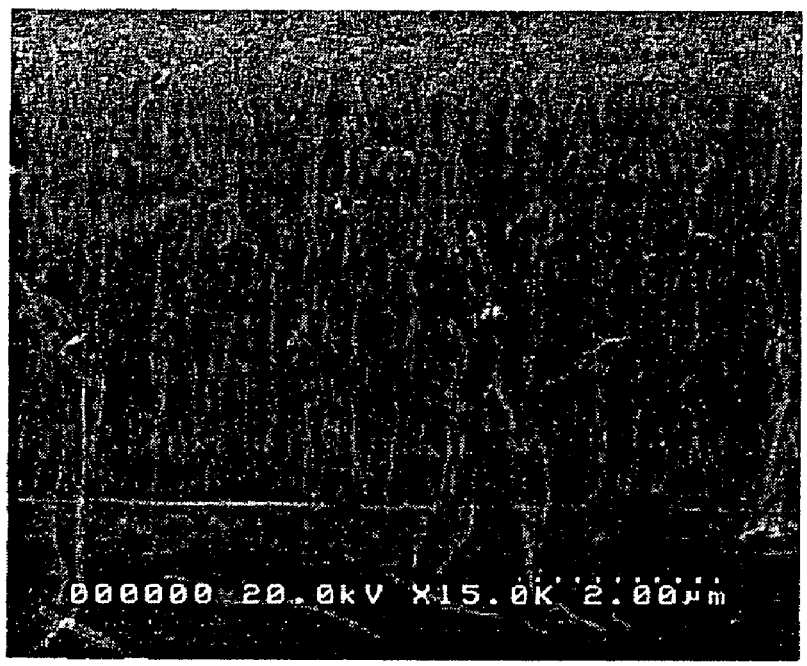
FIG. 1B is a magnified SEM image of the CNTs of FIG. 1A.

FIG. 1A is an SEM image of a carbon nanotube (CNT) emitter for a field emission display (FED) device formed by the chemical vapor deposition (CVD) method, and FIG. 1B is a magnified SEM image of the SEM image of FIG. 1A. As shown in FIGS. 1A and 1B, CNTs are densely formed on a surface of a catalyst metal layer.

Figure 2A:
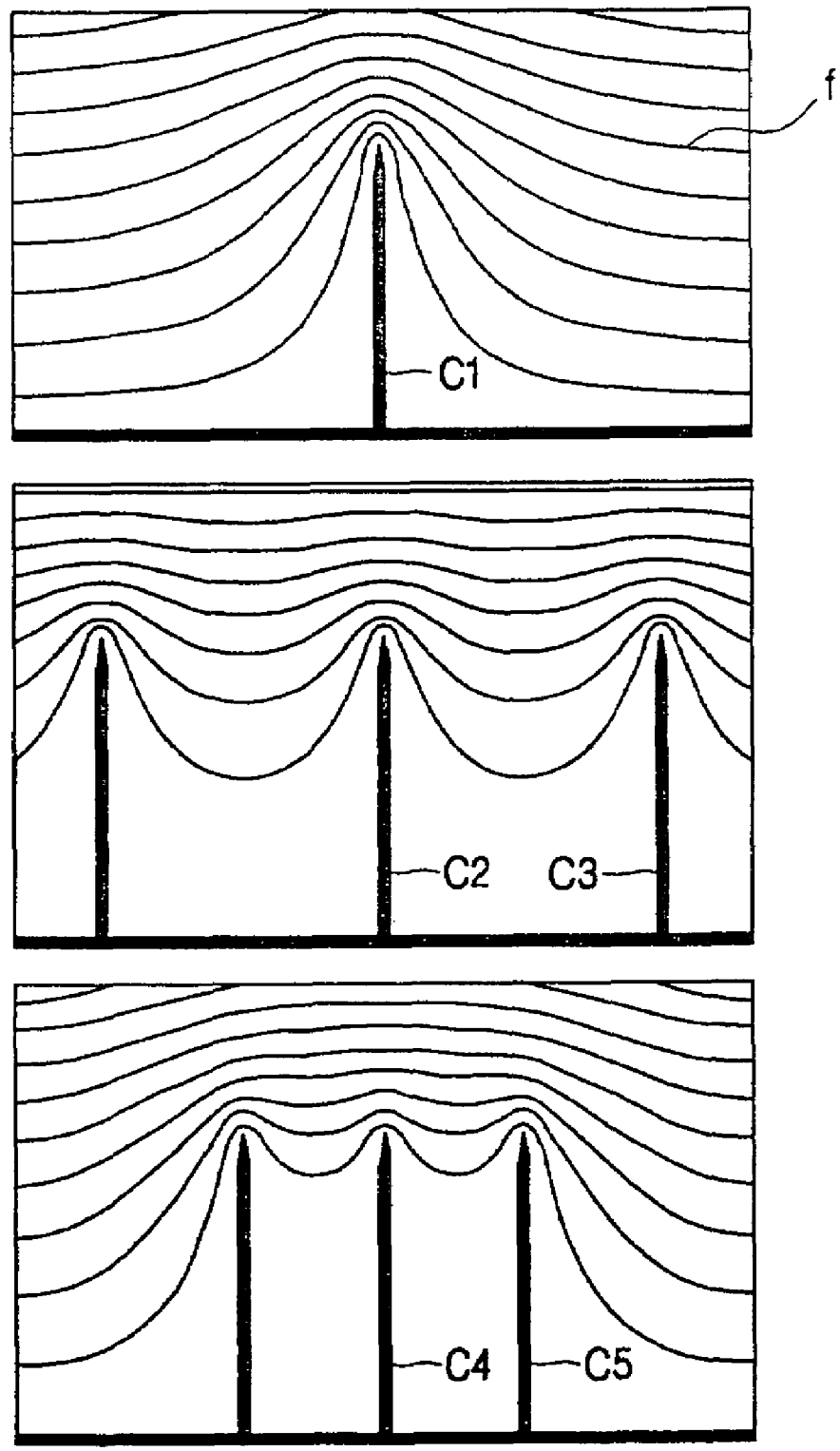
FIGS. 2A thru 2C are drawings showing the relationship between the density of CNTs as a field emission source and the characteristics of field emission of an FED device.
Figure 2B:
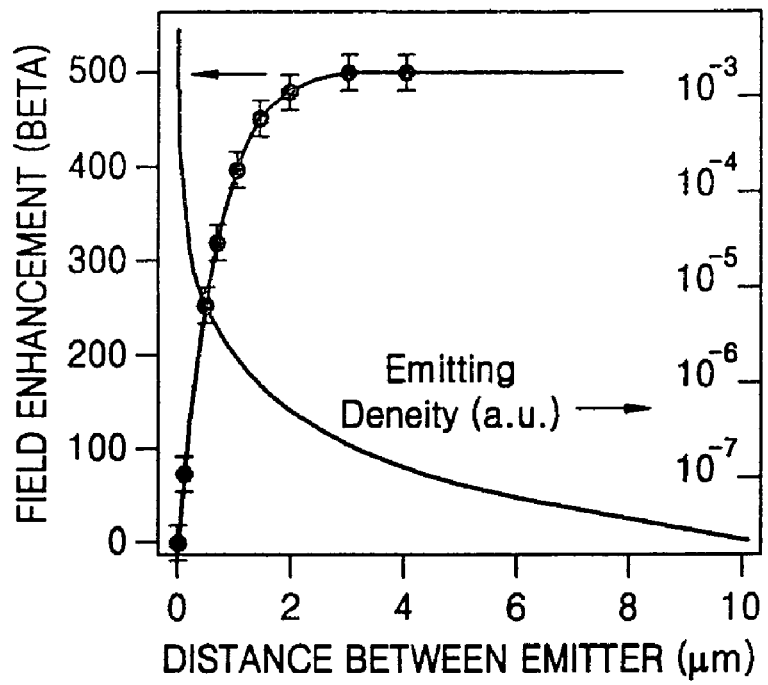
Figure 2C:
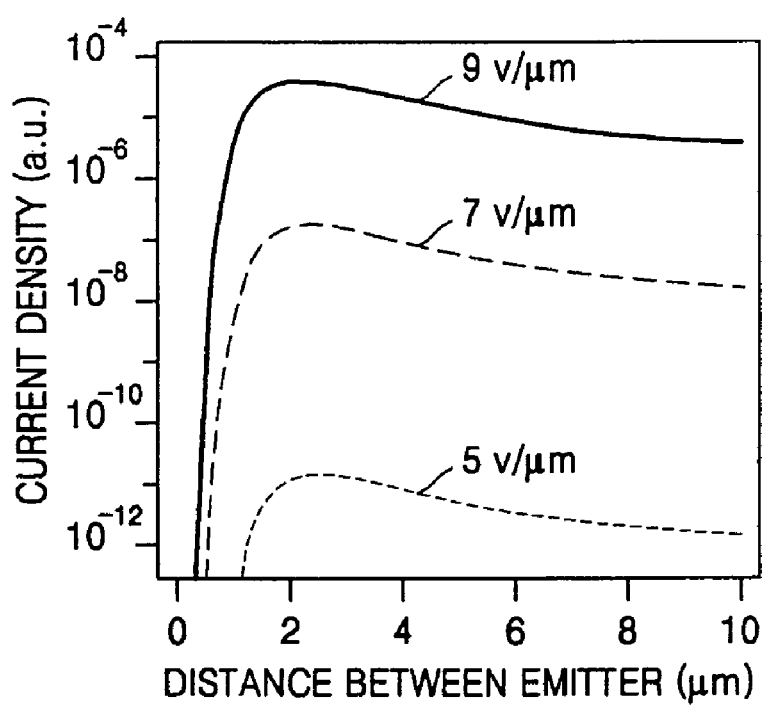

FIGS. 2A thru 2C are drawings showing the relationship between the density of CNTs as a field emission source and the field emission characteristics of an FED device. FIG. 2A shows a simulation result which indicates the degree of field penetration according to gaps of CNTs. When the equipotential lines f are compared, it is seen that the field enhancement is reduced as the gaps of the CNTs C1 through C5 are reduced due to a screening effect of the field. That is, the field cannot penetrate into the gaps; rather it forms a screen shape. FIGS. 2B and 2C are graphs showing current densities by field enhancement and field emission according to the gaps of the CNTs. As depicted in FIGS. 2B and 2C, as the gap is reduced, the field enhancement is reduced in a range of gaps of the CNTs smaller than approximately 2 μm, and accordingly, the current density is drastically reduced.

In turn, in growing CNTs as an electron emitter source for an FED device, the field emission characteristics can be improved by reducing the density of the CNTs to an appropriate level. Therefore, there is a need to develop a method of growing CNTs wherein the density of the CNTs can be controlled.

Figure 3:
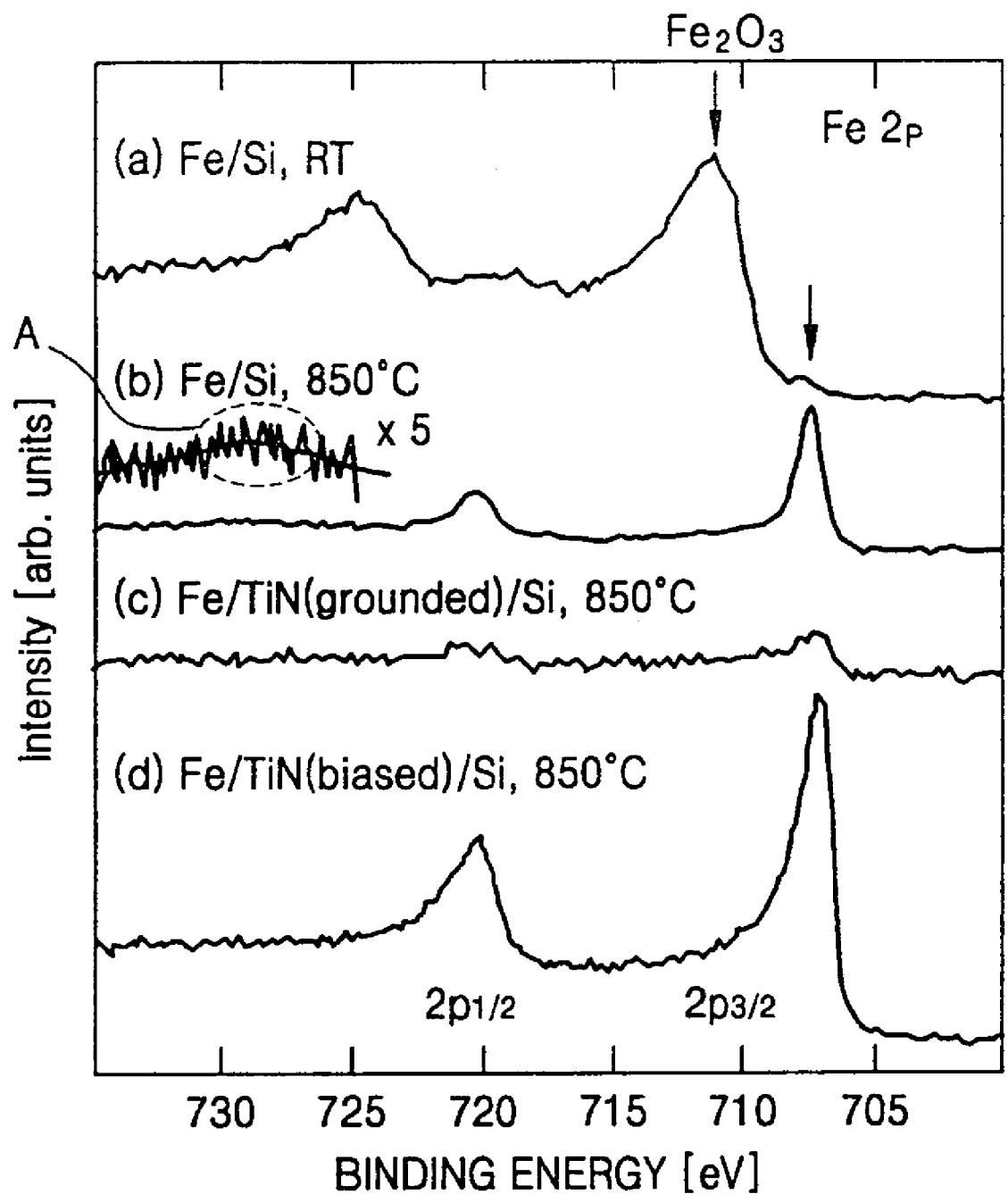
FIG. 3 is a graph showing the analysis of bonding energies of catalyst metal layer materials after performing thermal CVD using Fe as a catalyst.

FIG. 3 is a graph showing the analysis of bonding energies of catalyst metal layer materials after performing thermal CVD using Fe as a catalyst. In the case (b) of depositing Fe on a silicon layer and performing CVD at a high temperature of 850° C., a peak appears in a region, that is, in a region where the bonding energy is 725-730 eV. This indicates that iron silicide (FeSi) is formed.

When a titanium nitride (TiN) layer having a sufficient thickness is formed between a silicon layer and Fe, FeSi is not formed since the TiN layer acts as a diffusion barrier which blocks the diffusion between Fe and the silicon layer. Accordingly, it is seen that FeSi is formed by diffusion between Fe and the silicon layer.

Figure 4A:
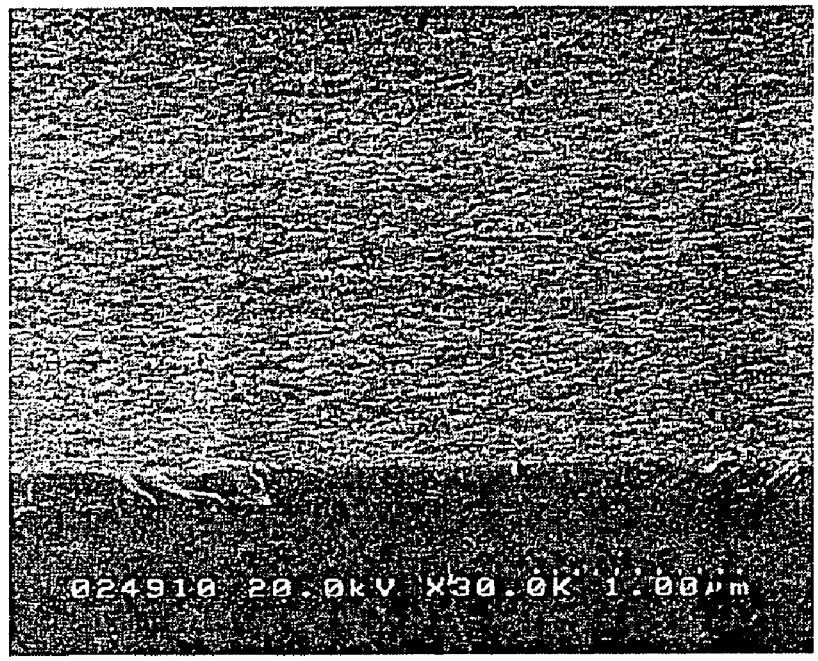
FIG. 4A is an SEM image showing the result of growing CNTs when a diffusion barrier is not disposed between a catalyst metal layer and a silicon layer.
Figure 4B:
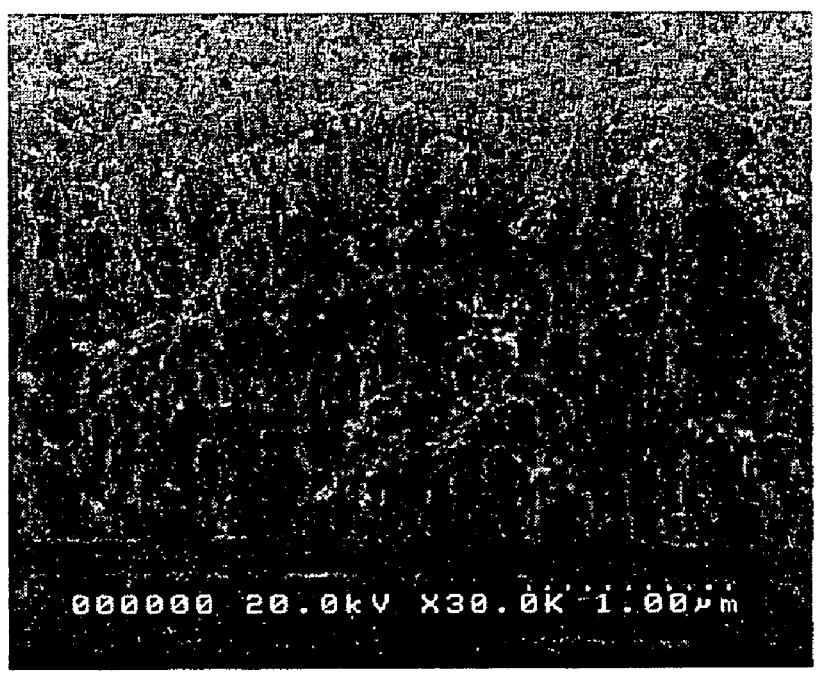
FIG. 4B is an SEM image showing the result of growing CNTs when a diffusion barrier is disposed between a catalyst metal layer and a silicon layer.

FIG. 4A is an SEM image showing the result of growing CNTs when a diffusion barrier is not disposed between a catalyst metal layer and a silicon layer. FIG. 4A shows no CNTs grown on a surface of a catalyst metal layer since the catalyst metal becomes a silicide. FIG. 4B is an SEM image showing the result of growing CNTs when a diffusion barrier is disposed between a catalyst metal layer and a silicon layer. FIG. 4B shows densely formed CNTs since a silicide is not formed on the catalyst metal layer. This is because a diffusion barrier blocks the migration of material between the catalyst metal layer and the silicon layer.

Figure 5:
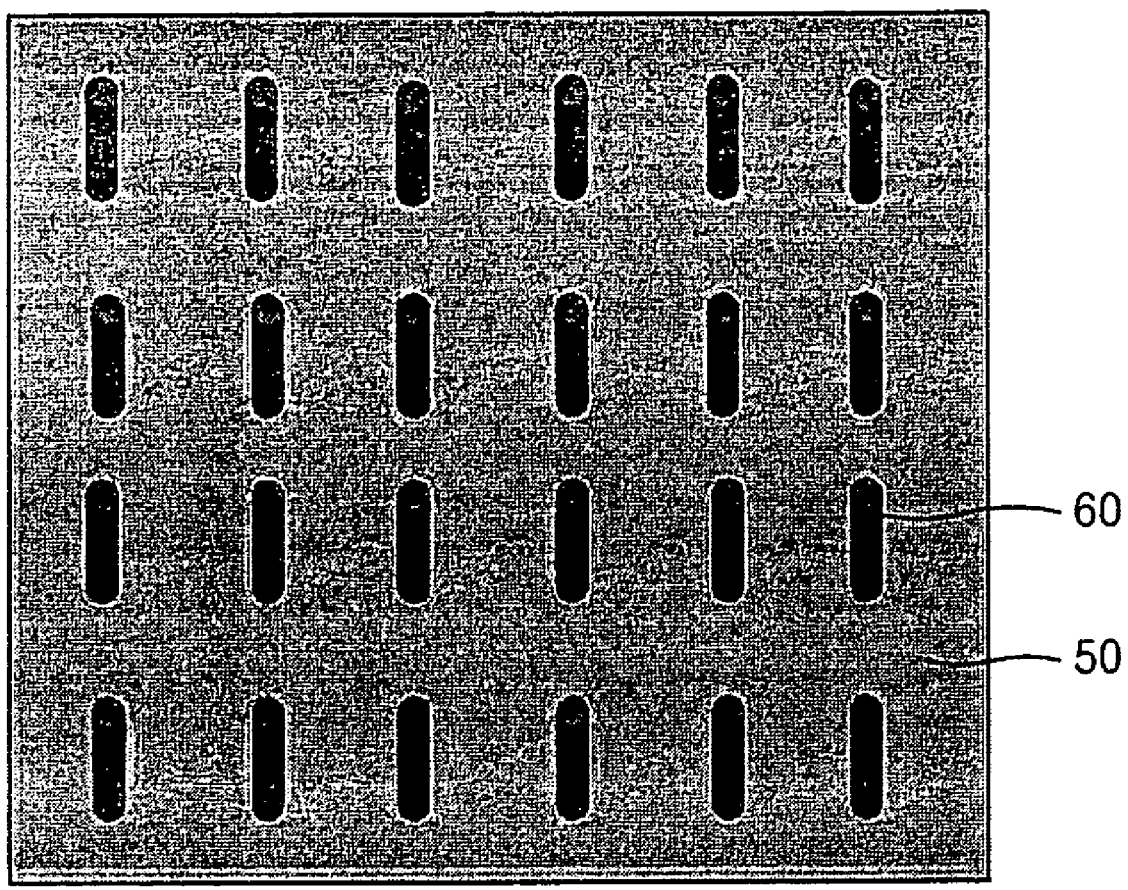
FIG. 5 is a schematic drawing showing the result of growing CNTs when a buffer layer is disposed between a catalyst metal layer and a silicon layer according to the present invention.

FIG. 5 is a schematic drawing showing the result of growing CNTs when a buffer layer is disposed between a catalyst metal layer and a silicon layer according to the present invention. CNTs 60, distributed in an appropriate gap as depicted in FIG. 5, can be obtained by performing a CVD method after forming a catalyst metal layer 50 and a buffer layer, and forming a silicide on the catalyst metal layer 50 by annealing the catalyst metal layer 50 and the buffer layer.

Figure 6A:
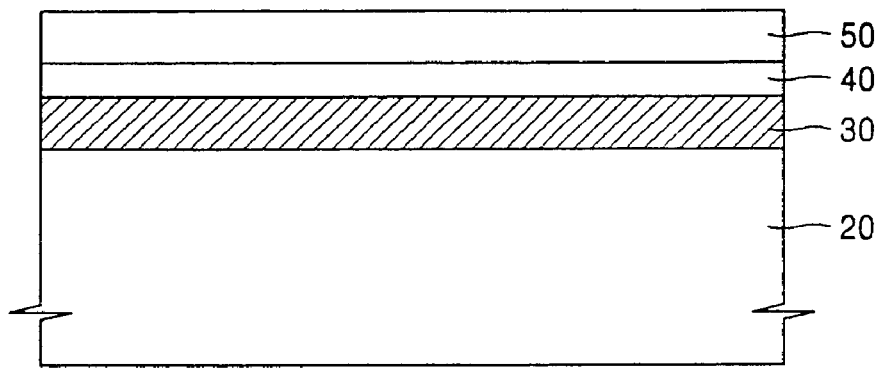
FIGS. 6A thru 6C are cross-sectional views illustrating a method of growing CNTs according to the present invention.
Figure 6B:
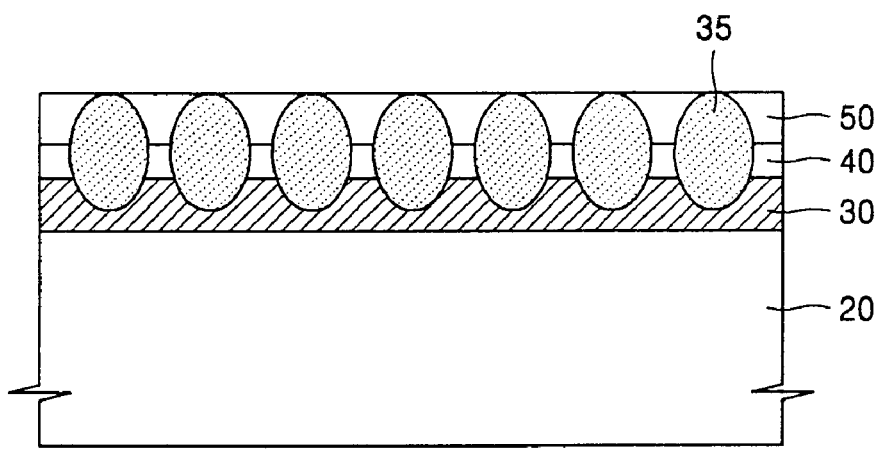
Figure 6C:
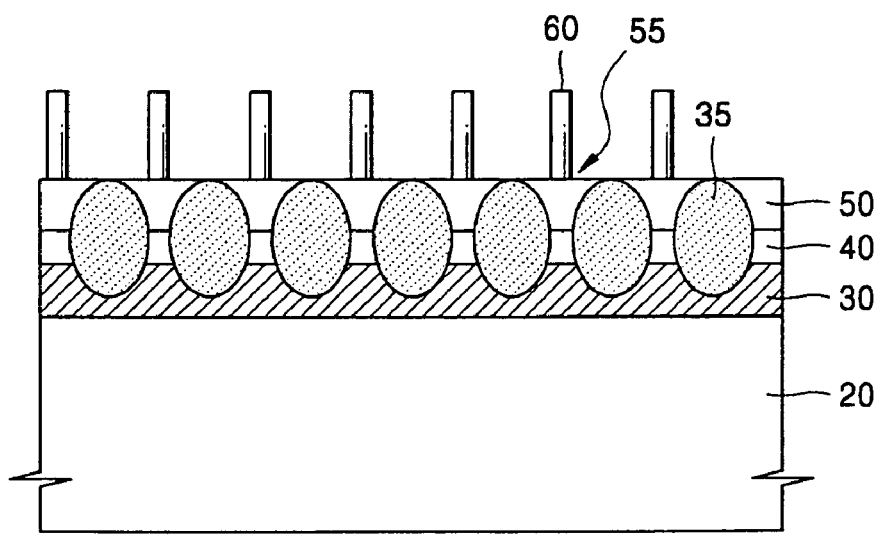

FIGS. 6A thru 6C are cross-sectional views illustrating a method of growing CNTs according to the present invention. Referring to FIG. 6A, after preparing a substrate 20 on which a silicon layer 30 formed, a buffer layer 40 and a catalyst metal layer 50 are sequentially formed on the silicon layer 30. The substrate 20 can be formed of various materials which do not deform in a CVD process, such as glass or metal.

The silicon layer 30 can be formed of amorphous silicon, crystal silicon, or other types of silicon. If the substrate is a silicon wafer, an additional silicon layer may not be necessary.

The buffer layer 40 is formed on the silicon layer 30. The buffer layer 40 can be formed by depositing a metal, such as Ti, TiN, Al, Cr, Nb, and Cu, or an alloy of these metals, on a surface of the silicon layer 30. The buffer layer 40, which is called a diffusion barrier since it shields the migration of a material at a high temperature, shields or mitigates the migration of a material between layers by diffusion. When the buffer layer 40 is formed to an appropriate thickness, the diffusion of a material between layers at a high temperature can be controlled.

The catalyst metal layer 50 is formed on the buffer layer 40. The catalyst metal layer 50 can be formed by depositing a metal, such as Ni, Fe, Co, Pt, Mo, W, Y, Au, and Pd, or an alloy of these metals, on a surface of the buffer layer 40. The catalyst metal layer 50 facilitates the growing of CNTs vertically from a surface of the catalyst metal layer 50 when the CNTs are grown using a CVD method.

The buffer layer 40 and the catalyst metal layer 50 are preferably formed by magnetron sputtering or electron beam evaporation.

When the buffer layer 40 and the catalyst metal layer 50 are formed on the silicon layer 30, the substrate 20 (on which the layers 30, 40 and 50 are disposed) is annealed. The annealing is preferably performed using an infrared ray annealing method or a resistance annealing method in a vacuum atmosphere, and the temperature and annealing time can be determined according to the heat resistance temperature of the substrate, the respective thicknesses of the catalyst metal layer and the buffer layer, and the density of the CNTs to be obtained.

For example, if the substrate is formed of glass, the annealing temperature is maintained at less than 580° C. approximately. The annealing time can be determined by the factors described above. A similar density of CNTs can be obtained by controlling the temperature and the annealing time so that, if the temperature is high, the annealing time can be reduced, and if the temperature is low, the annealing time can be increased.

As depicted in FIG. 6B, through the annealing process, partial metal silicide domains are formed due to diffusion between the silicon layer 30, the buffer layer 40 and the catalyst metal layer 50. If the annealing conditions are identical, the metal silicide domains 35 can be uniformly distributed on the entire surface of the catalyst metal layer 50, and the density of the metal silicide domains 35 increases with an increase in the annealing temperature and time.

Referring to FIG. 6C, after annealing, CNTs 60 are grown on the catalyst metal layer 50 using CVD. To grow CNTs, a thermal CVD method or a PECVD method can be used, but the present invention is not limited thereto, and any method which can grow CNTs on a surface of the catalyst metal can be used.

When the thermal CVD method is used, CNTs 60 can be vertically formed on a surface of the catalyst metal layer 50 by injecting both a gas containing carbon, such as $CH_4$, $C_2H_2$, $C_2H_4$, $C_2H_6$, CO, or $CO_2$, and a gas such as $H_2$, $N_2$, or Ar into a reactor which is maintained at a temperature of approximately 500-900° C.

However, as described above, CNTs 60 are not grown on surfaces of the metal silicide domains 35, but are grown on regions 55 outside of the metal silicide domains 35. Therefore, the CNTs 60 can be distributed in a predetermined gap according to the degree of formation of silicide of the catalyst metal layer 50.

The conditions of the method of forming the CNTs 60 described above can vary according to the usage of the CNTs since manufacturing conditions, such as the thicknesses of the catalyst metal layer and the buffer layer and annealing temperature and time, may vary according to usage of the CNTs. That is, in the method of growing CNTs according to the present invention, the density of CNTs can be controlled by controlling the annealing time and temperature.

Figure 7A:
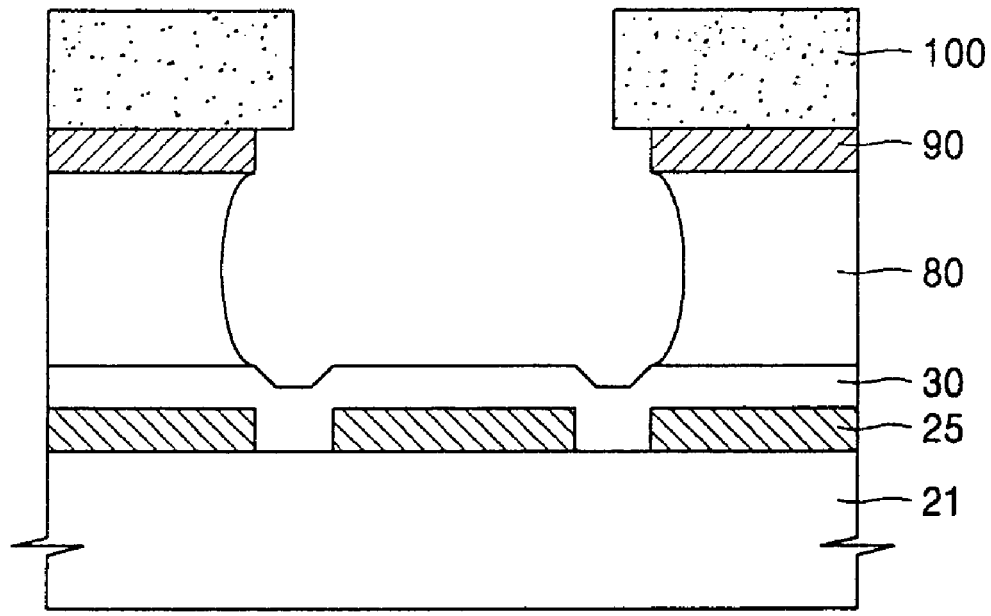
FIGS. 7A thru 7D are cross-sectional views illustrating a method of manufacturing an FED device according to an embodiment of the present invention.

FIGS. 7A thru 7D are cross-sectional views illustrating a method of manufacturing an FED device according to an embodiment of the present invention. Referring to FIG. 7A, a cathode 25, a silicon layer 30, a gate insulating layer 80 and a gate electrode 90 are formed on an upper surface of a substrate 21. As an example, after patterning an indium tin oxide (ITO) electrode on an upper surface of a glass substrate 21, an amorphous silicon a-Si layer 30 is preferably formed on the ITO electrode and the substrate 21.

A gate insulating layer 80 formed of an insulating material, such as $SiO_2$, is formed on the amorphous silicon a-Si layer 30. After depositing a metal, such as Cr, on the gate insulating layer 80, a gate electrode 90 is formed by patterning the metal. Also, the amorphous silicon a-Si layer 30 is exposed by forming a well at a predetermined location by perforating the gate electrode 90 and the gate insulating layer 80.

Figure 7B:
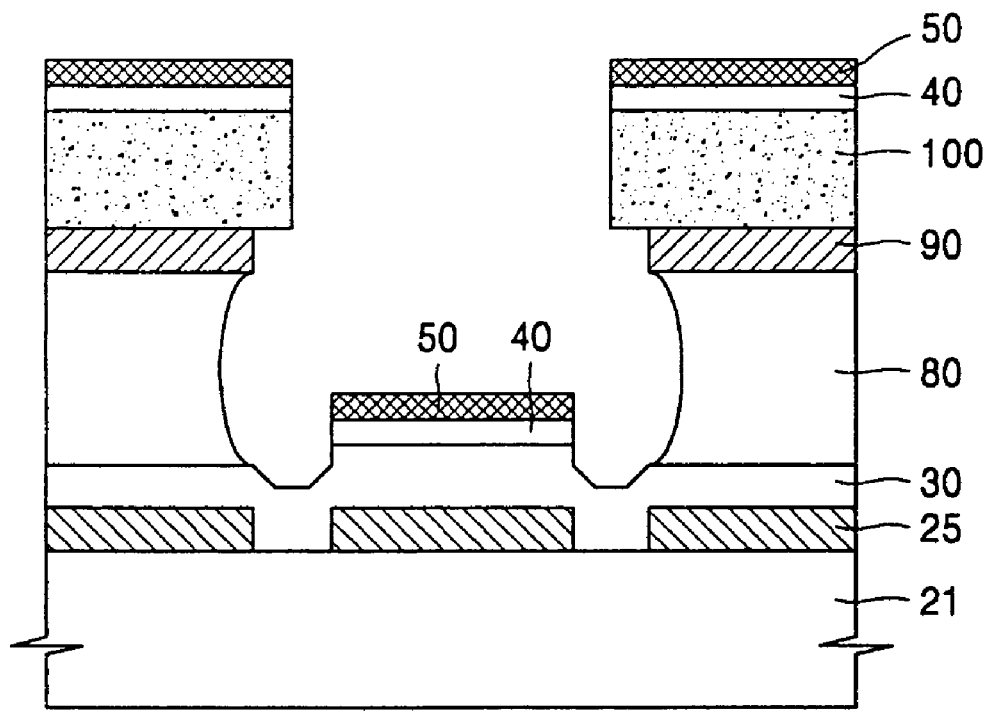

Referring to FIG. 7B, a buffer layer 40 and a catalyst metal layer 50 are deposited on the amorphous silicon layer 30 and on the photoresist layer 100. To selectively deposit the buffer layer 40 and the catalyst metal layer 50 on the amorphous silicon a-Si layer 30, a photoresist lift-off method is preferably used, and the deposition method can be magnetron sputtering or electron beam evaporation.

Next, the substrate 21 on which the buffer layer 40 and the catalyst metal layer 50 are formed is annealed, which is an aspect of the present invention. Diffusion between the amorphous silicon a-Si layer 30, the buffer layer 40 and the catalyst metal layer 50 is promoted by annealing at a temperature range that does not deform the substrate 21. Accordingly, metal silicide domains 35 are partly formed on the catalyst metal layer 50.

Figure 7C:
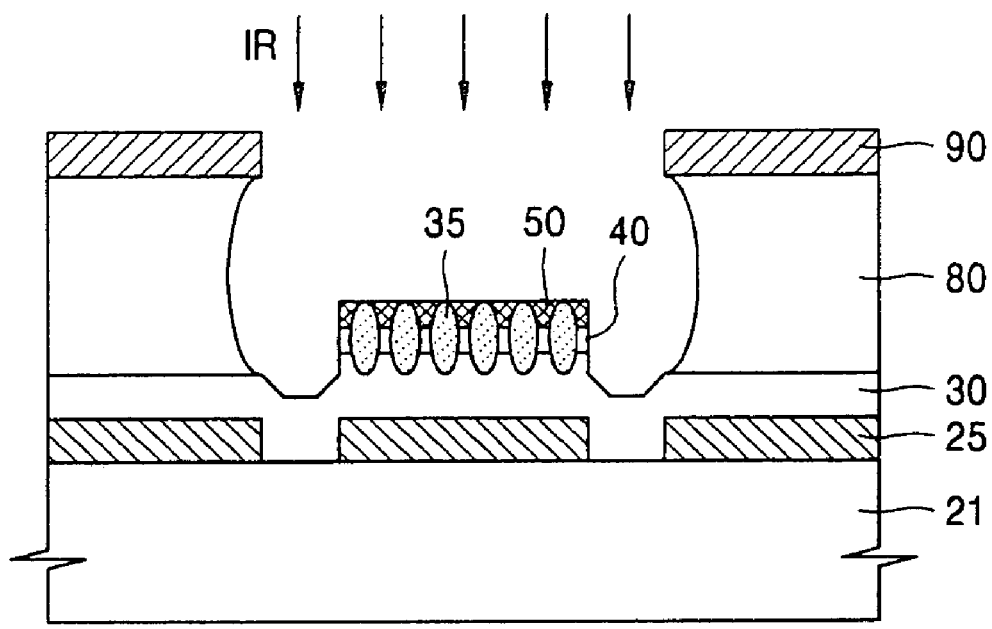

The annealing can be performed by various methods, such as an infrared ray annealing method, a resistance annealing method, or a high frequency annealing method, preferably in a vacuum atmosphere. To make the process simple and to reduce equipment cost, an annealing method, such as a thermal CVD method, is preferably used. An infrared ray annealing method can be used for both annealing and thermal CVD. When an upper surface of the substrate 21 is uniformly heated by the infrared ray annealing method, the metal silicide domains 35 can be uniformly distributed since the silicification of the catalyst metal layer 50 is uniformly achieved. FIG. 7C is a cross-sectional view illustrating a state of formation of metal silicide domains 35 through annealing.

To form the metal silicide appropriately, the thicknesses of the catalyst metal layer 50 and the buffer layer 40 are preferably formed to approximately 0.5-10 nm and 1-10 nm, respectively. If the catalyst metal layer 50 and the buffer layer 40 are formed so as to be excessively thin, control of silicification by diffusion is difficult, and if the thicknesses of the catalyst metal layer 50 and the buffer layer 40 are formed so as to be excessively thick, silicon may not diffuse into a surface of the catalyst metal layer 50.

The annealing can be performed at various combinations of annealing temperature and time within a temperature range of 450-850° C. and a time range of 1 second to 30 minutes. According to the present invention, annealing is preferably performed at a temperature range of 450-580° C. for 5-30 minutes in consideration of the manufacturing efficiency and the thermal resistance of the glass substrate. A similar effect can be obtained even if the annealing is performed at a lower temperature than 450° C. for a longer time than 30 minutes, and also a similar effect can be obtained even if the annealing is performed at a higher temperature than 580° C. for a shorter time than 5 minutes as long as the substrate can remain without deformation at that temperature.

Figure 7D:
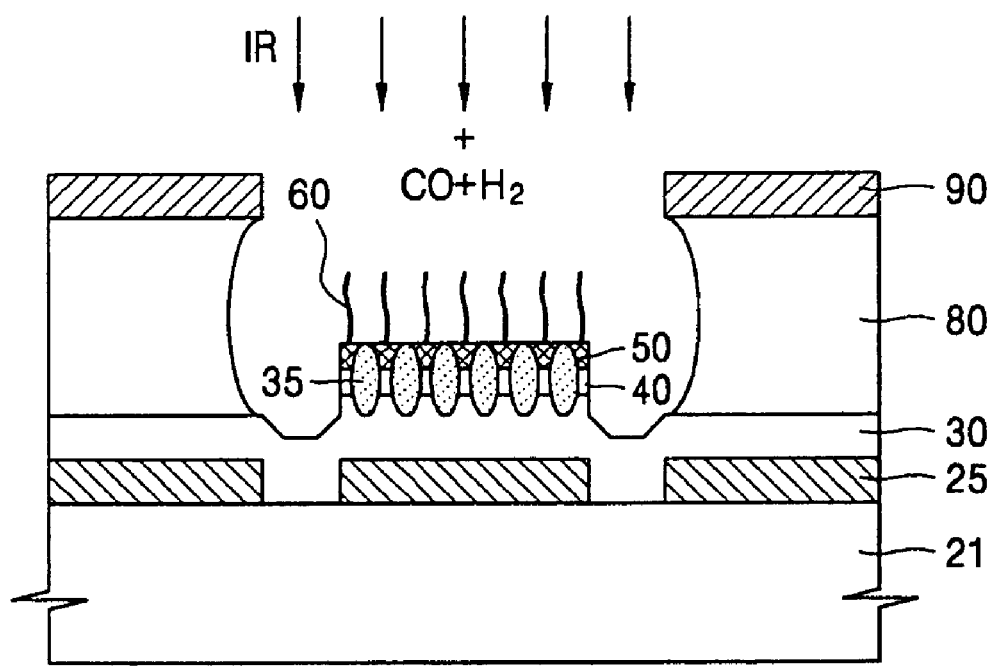

Next, CNTs 60 are grown on a surface of the catalyst metal layer 50 on which the metal silicide domains 35 are formed by annealing. The growing process preferably uses a thermal CVD method and an infrared ray annealing method, but the present invention is not limited thereto. Referring to FIG. 7D, CNTs 60 distributed at a predetermined distance from each other are grown from regions of a surface of the catalyst metal layer 50 except for the metal silicide domain 35 regions. Accordingly, a CNT emitter having superior field emission characteristics can be provided.

Figure 8:
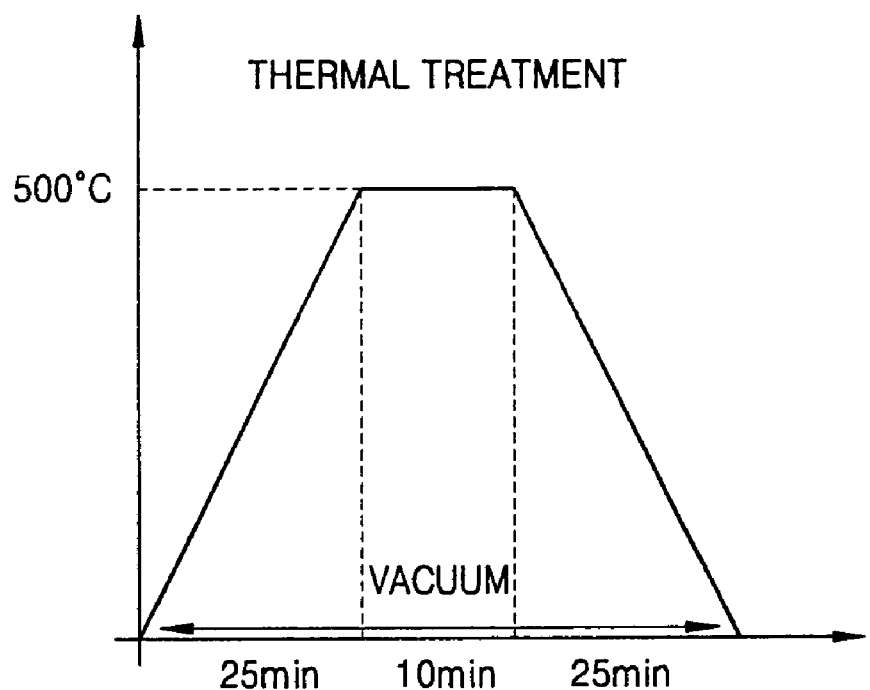
FIG. 8 is a graph showing an example of variation of temperature conditions with time in an annealing process according to the present invention.

FIG. 8 is a graph showing an example of variation of temperature conditions with time in an annealing process according to the present invention. The annealing temperature and time can be determined by various limiting factors as described above. For example, if the substrate is formed of glass, the silicon layer is formed of amorphous silicon, the buffer layer is formed of an Al layer having a thickness of approximately 1 nm and a Ti layer having a thickness of approximately 5 nm, and the catalyst metal layer is formed of an invar having a thickness of approximately 5 nm, the annealing process can be performed at a temperature of approximately 500° C. for approximately 10 minutes. The annealing can include a heating time of 25 minutes and a cooling time of 25 minutes before and after the annealing. As described above, a similar effect can be obtained by increasing the annealing temperature within a temperature range in which the glass substrate can withstand deformation and reducing the annealing time.

Figure 9:
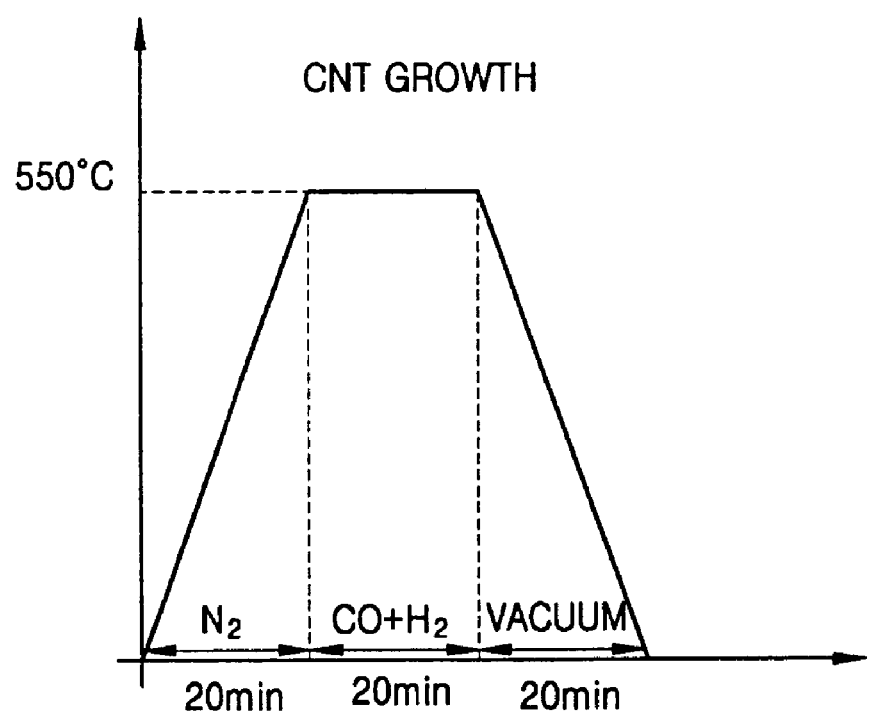
FIG. 9 is a graph showing an example of variation of temperature conditions with time in thermal CVD process according to the present invention.

FIG. 9 is a graph showing an example of variation of temperature conditions with time in a thermal CVD process according to the present invention. If the conditions are the same as in the case of FIG. 7, CNTs 60 can be grown by increasing the temperature for approximately 20 minutes under an $N_2$ atmosphere, maintaining the temperature at 550° C. for approximately 20 minutes by injecting CO and $H_2$, and reducing the temperature for approximately 20 minutes under a vacuum state of approximately 50 torr using thermal CVD of an infrared ray annealing method. The time and temperature indicated above are illustrative examples, and the method of forming CNTs according to the present invention is not limited thereto.

FIGS. 10A thru 10F are SEM images showing the results of growing CNTs by varying the temperature of an annealing process according to the present invention. FIGS. 10A thru 10F show the density variation of CNTs according to the annealing temperature as the result of performing thermal CVD for 20 minutes after annealing, all cases, for 10 minutes under a vacuum state.

Figure 10A:
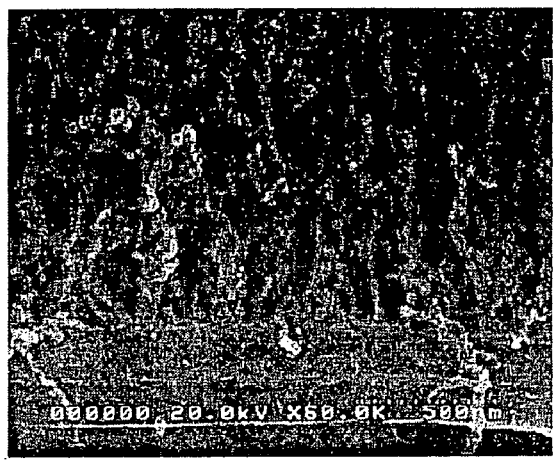
FIGS. 10A thru 10F are SEM images showing the results of growing CNTs by varying the temperature of an annealing process according to the present invention.
Figure 10B:
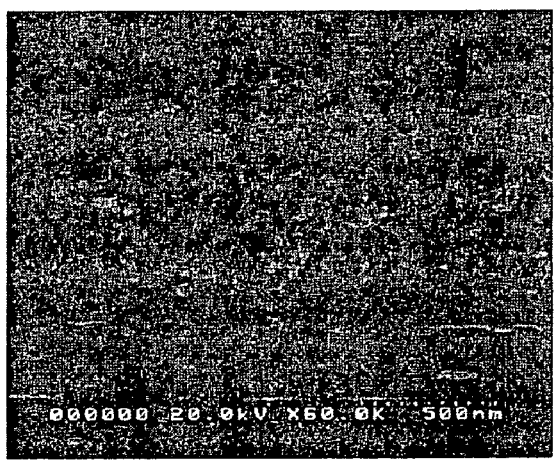
Figure 10C:
Figure 10D:
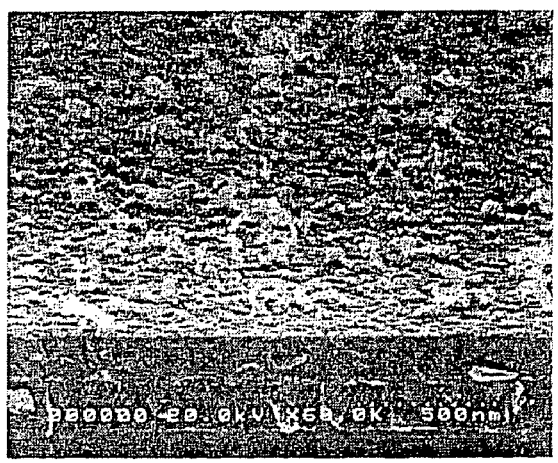
Figure 10E:
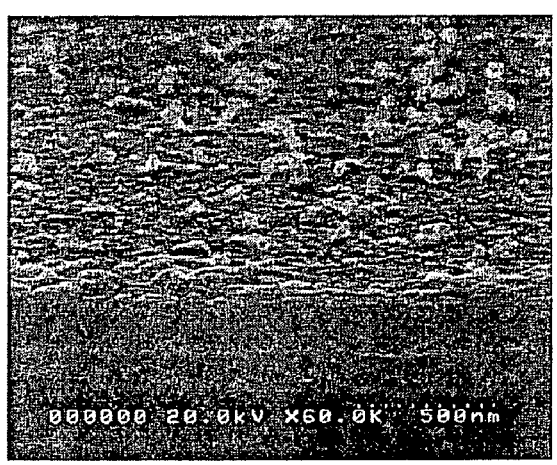
Figure 10F:
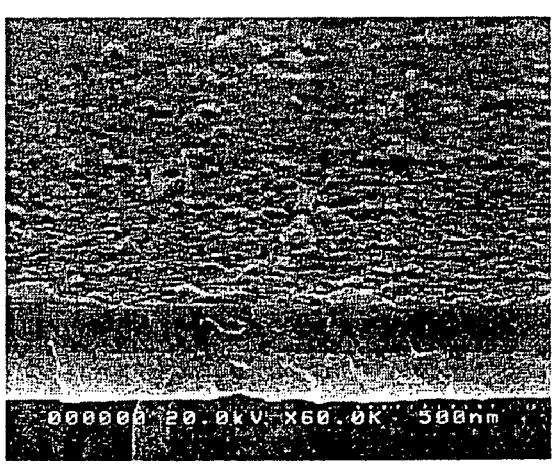

FIG. 10A shows a case where an annealing process is not performed. FIG. 10B and FIG. 10C show the states of CNTs annealed at temperatures of 450° C. and 460° C., respectively. FIGS. 10D thru 10F show the results of annealing with respective temperatures which increase by 10°. The density of CNTs formed by CVD is significantly reduced relative to the case of annealing at a temperature of approximately 460° C. for approximately 10 minutes as depicted in FIG. 10C. That is, gaps between the CNTs are increased.

Figure 11:
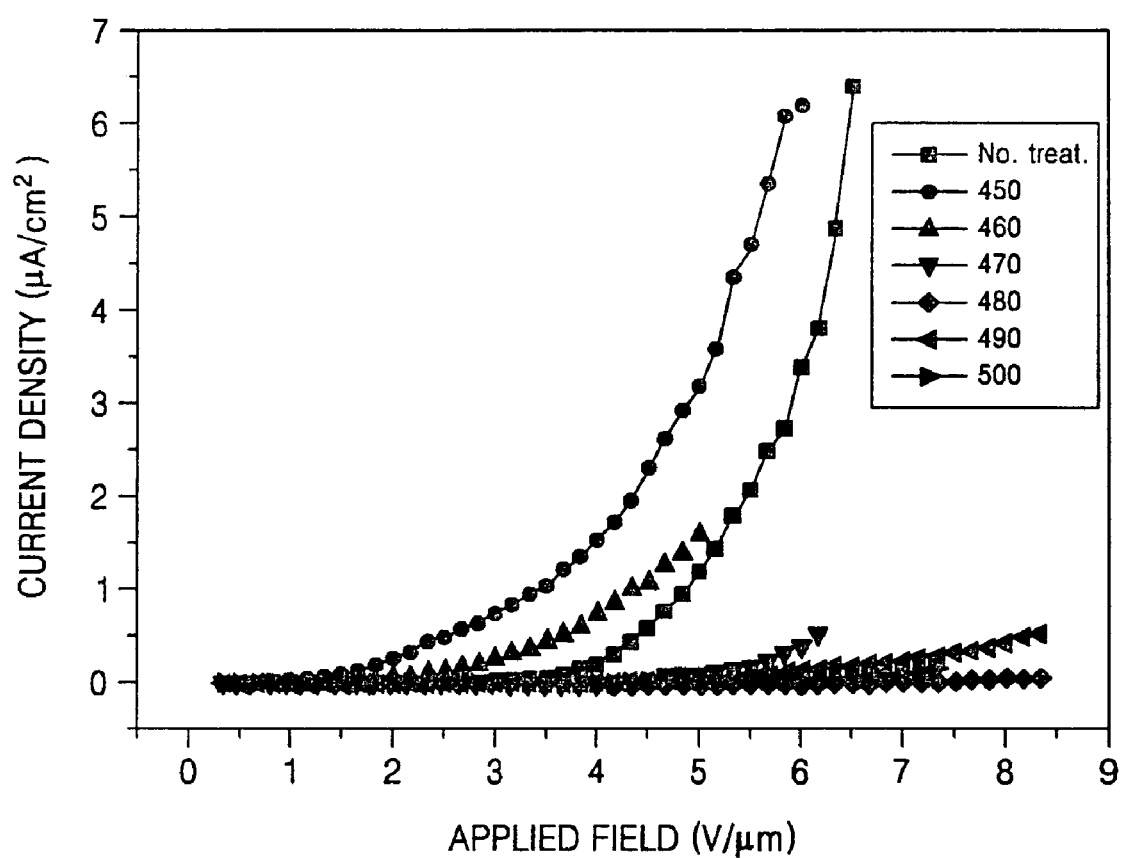
FIG. 11 is a graph showing the results of field emission experiments using the CNTs depicted in FIGS. 10A thru 10F as electron emission sources.

FIG. 11 is a graph showing the results of field emission experiments using the CNTs depicted in FIGS. 10A thru 10F as electron emission sources. The graph shows test results of emission characteristics of a diode at a vacuum state of approximately $2 \times 10^{-5}$ torr. At this point, an anode is a substrate on which an ITO electrode is formed, and a gap between the anode and a cathode is 300 μm. As depicted in FIGS. 10A thru 10C, the cases of annealing at temperatures of 450° C. and 460° C. show superior current density than the case wherein the annealing process is not performed.

Figure 12A:
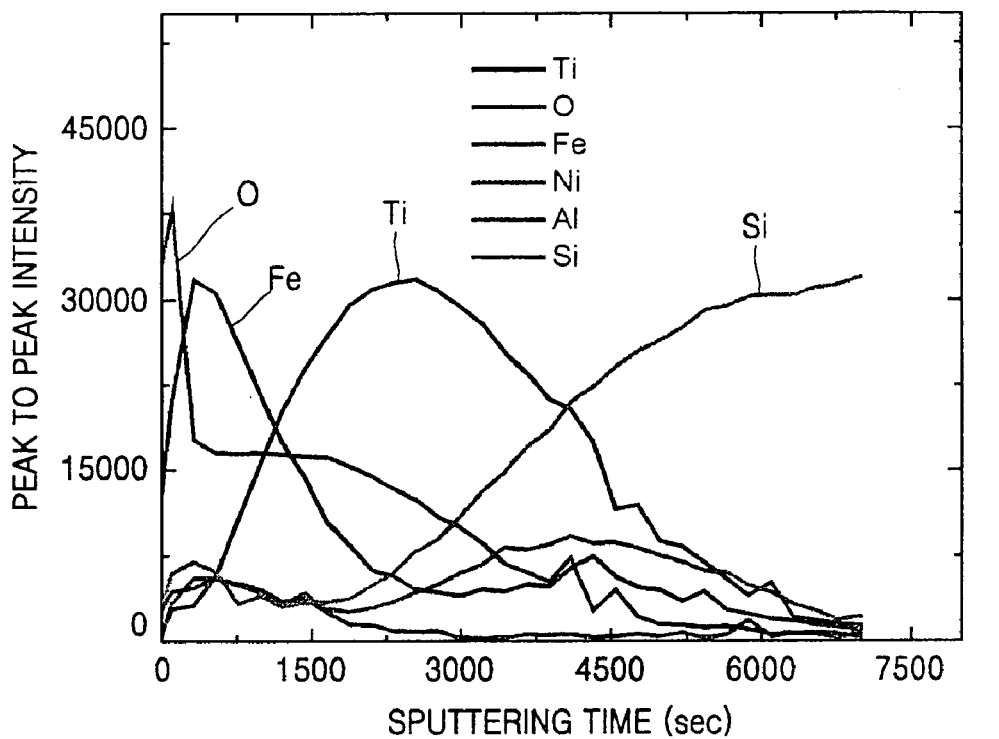
FIGS. 12A and 12B are graphs showing the distribution of components in substrates according to depth from the surface while sputtering the substrates which have been annealed at temperatures of 480° C. and 500° C., respectively.
Figure 12B:
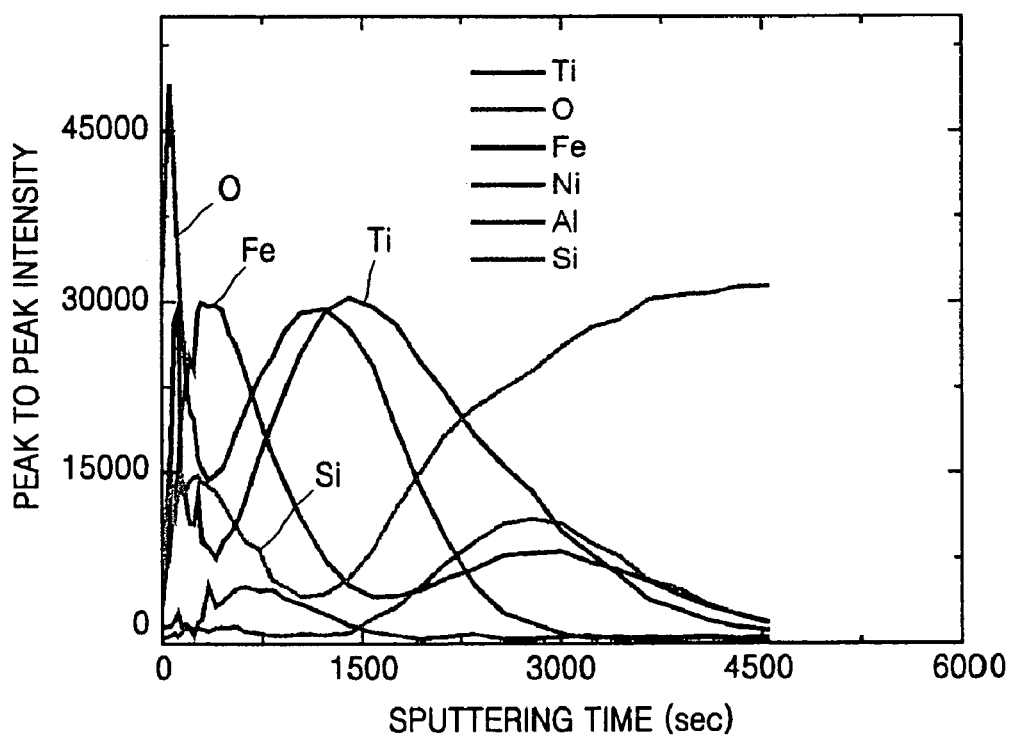

FIGS. 12A and 12B are graphs showing the distribution of components in substrates according to depth from the surface while sputtering the substrates which have been annealed at temperatures of 480° C. and 500° C., respectively. One thing to note when comparing FIGS. 12A and 12B is that Si is distributed closer to a surface by diffusion. As described above, this result denotes that Si has silicified Fe or Ni contained in an invar, which is a catalyst metal layer, by diffusion through a buffer layer.

Figure 13:
FIG. 13 is an SEM image showing CNTs grown according to an embodiment of the present invention.

FIG. 13 is an SEM image showing CNTs grown according to an embodiment of the present invention. FIG. 13 shows the results of performing a thermal CVD method at a temperature of approximately 550° C. for approximately 30 minutes under a vacuum state of 50 torr after annealing a substrate, on which a silicon layer, a buffer layer and a catalyst metal layer are formed with the same thicknesses as in the embodiment described with reference to FIG. 8, at a temperature of approximately 480° C. for 18 minutes under a vacuum state.

The gap between the CNTs in FIG. 13 is approximately 500 nm. This gap is a trade-off value between a field enhancement value and an emitting density value, and is considered an appropriate gap when compared to FIG. 1B. That is, to obtain an emitter of an FED device having high field emission characteristics, it is desirable to follow the conditions for annealing and thermal CVD described above.

Figure 14:
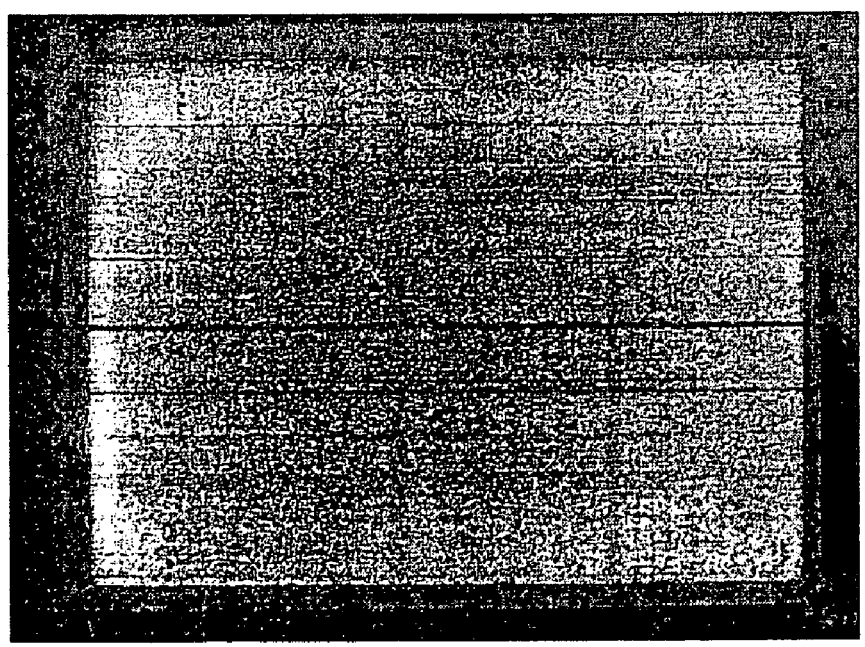
FIG. 14 is an image of an FED device having a three-electrode structure manufactured according to an embodiment of the present invention.

FIG. 14 is an image of an FED device having three electrode structure manufactured according to an embodiment of the present invention. The current has a value of 65 μA by electron emission under a condition of a gate voltage Vg=100V and an anode voltage Va=500V. As depicted in FIG. 14, an FED device having high emission characteristics can be obtained by the method of manufacturing an FED device according to the present invention.

According to the present invention, in growing CNTs, the density of the CNTs can be controlled by a simple annealing process.

According to the present invention, an FED device having superior emission characteristics can be manufactured with minimum labor and low cost by controlling the density of a CNT emitter using conventional CVD equipment.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of forming carbon nanotubes (CNTs), comprising the steps of:
    preparing a substrate on which a silicon layer is formed;
    sequentially forming a buffer layer and a catalyst metal layer on the silicon layer;
    partly forming metal silicide domains by diffusion between the silicon layer, the buffer layer and the catalyst metal layer by annealing the substrate so that the metal silicide domains are distributed along a surface of the catalyst metal layer so as to form regions outside the metal silicide domains located between adjacent metal silicide domains on the surface of the catalyst metal layer; and
    growing CNTs in the regions outside the metal silicide domains on the surface of the catalyst metal layer.

2. The method of claim 1, wherein the silicon layer is one of an amorphous silicon layer and a crystal silicon layer.

3. The method of claim 1, wherein the annealing is performed by one of an infrared ray annealing method and a resistance heating method in a vacuum atmosphere.

4. The method of claim 1, wherein the catalyst metal layer is formed of a material selected from the group consisting of Ni, Fe, Co, Pt, Mo, W, Y, Au, Pd, and an alloy thereof.

5. The method of claim 1, wherein the buffer layer is formed of a metal selected from the group consisting of Ti, TiN, Al, Cr, Nb, Cu, and an alloy thereof.

6. The method of claim 1, wherein the buffer layer and the catalyst metal layer are formed by one of magnetron sputtering and electron beam evaporation.

7. The method of claim 1, wherein the CNTs are grown by one of thermal chemical vapor deposition (CVD) and plasma enhanced chemical vapor deposition (PECVD).

8. A method of manufacturing a field emission display (FED) device, comprising the steps of:
    preparing a substrate on which a cathode, a silicon layer which covers the cathode and the substrate, a gate insulating layer which covers the silicon layer, and a gate electrode are formed;
    forming a well in the gate electrode and the gate insulating layer so that the well exposes the silicon layer on a bottom thereof;
    sequentially forming a buffer layer and a catalyst metal layer on the silicon layer;
    partly forming metal silicide domains in the silicon layer, the buffer layer and the catalyst metal layer by diffusion between the silicon layer, the buffer layer and the catalyst metal layer by annealing the substrate; and
    forming a carbon nanotube (CNT) emitter by growing CNTs on a surface of the catalyst metal layer.

9. The method of claim 8, wherein the silicon layer is one of an amorphous silicon layer and a crystal silicon layer.

10. The method of claim 8, wherein the annealing is performed by one of an infrared ray annealing method and a resistance heating method under a vacuum state.

11. The method of claim 8, wherein the catalyst metal layer is formed of a material selected from the group consisting of Ni, Fe, Co, Pt, Mo, W, Y, Au, Pd, and an alloy thereof.

12. The method of claim 8, wherein the buffer layer is formed of a metal selected from the group consisting of Ti, TiN, Al, Cr, Nb, Cu, and an alloy thereof.

13. The method of claim 8, wherein the buffer layer and the catalyst metal layer are formed by one of magnetron sputtering and electron beam evaporation.

14. The method of claim 8, wherein the catalyst metal layer has a thickness in a range of 0.5-10 nm.

15. The method of claim 8, wherein the buffer layer has a thickness in a range of 1-10 nm.

16. The method of claim 8, wherein an annealing temperature is in a range of 450-850° C. and an annealing time is in a range of 1 second to 30 minutes.

17. The method of claim 8, wherein the catalyst metal layer has a thickness in a range of 0.5-10 nm, the buffer layer has a thickness in a range of 1-10 nm, an annealing temperature is in a range of 450-850° C., and an annealing time is in a range of 1 second to 30 minutes.

18. The method of claim 8, wherein the CNTs are grown by one of thermal chemical vapor deposition (CVD) and plasma enhanced chemical vapor deposition (PECVD).

19. A method of controlling a density of carbon nanotubes (CNTs), comprising the steps of:

preparing a substrate on which a silicon layer is formed;

sequentially forming a buffer layer and a catalyst metal layer on the silicon layer;

partly forming metal silicide domains in the silicon layer, the buffer layer and the catalyst metal layer by diffusion between the silicon layer, the buffer layer and the catalyst metal layer by annealing the substrate so that the metal silicide domains are distributed along a surface of the catalyst metal layer so as to form regions outside the metal silicide domains located between adjacent metal silicide domains on the surface of the catalyst metal layer; and growing CNTs in the regions outside the metal silicide domains on a surface of the catalyst metal layer;

wherein a density of the CNTs grown on the surface of the catalyst metal layer is controlled by controlling an annealing temperature and an annealing time.

20. The method of claim 19, wherein the annealing is performed by one of an infrared ray annealing method and a resistance heating method under a vacuum state.

21. The method of claim 19, wherein an annealing temperature is in a range of 450-850° C. and an annealing time is in a range of 1 second to 30 minutes.

22. The method of claim 19, wherein the catalyst metal layer has a thickness in a range of 0.5-10 nm, the buffer layer has a thickness in a range of 1-10 nm, an annealing temperature is in a range of 450-850° C., and an annealing time is in a range of 1 second to 30 minutes.

23. The method of claim 19, wherein the CNTs are grown by one of thermal chemical vapor deposition (CVD) and plasma enhanced chemical vapor deposition (PECVD).

* * * * *